Oct. 10, 1944.                R. W. JOHNSON                2,359,992
            MANUALLY SETTABLE THREE-POSITIONING METERING VALVE
                        Filed Aug. 4, 1940           2 Sheets-Sheet 1
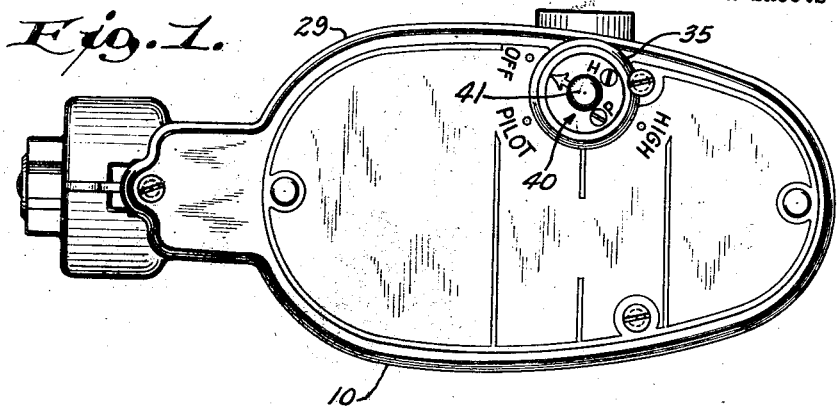
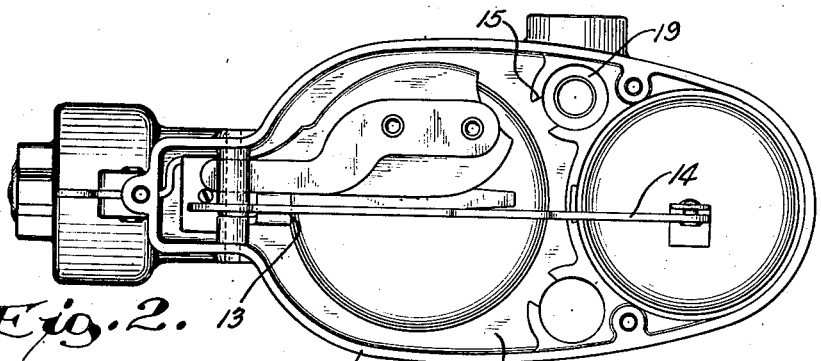
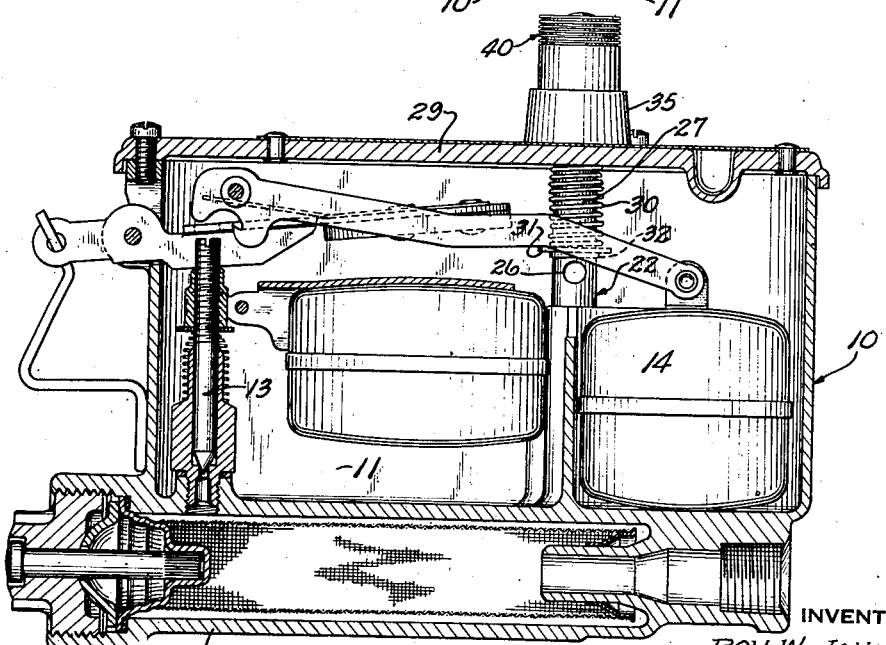
INVENTOR
ROY. W. JOHNSON.
BY
John W. Michael
ATTORNEY Oct. 10, 1944.  R. W. JOHNSON  2,359,992
MANUALLY SETTABLE THREE-POSITIONING METERING VALVE
Filed Aug. 4, 1940  2 Sheets-Sheet 2

INVENTOR
ROY W. JOHNSON.
BY John W. Whitacre
ATTORNEY.

Patented Oct. 10, 1944

2,359,992

UNITED STATES PATENT OFFICE 2,359,992

MANUALLY SETTABLE THREE-POSITIONING METERING VALVE

Roy W. Johnson, Milwaukee, Wis.

Application August 4, 1940, Serial No. 351,308

2 Claims. (Cl. 137—21)

This invention relates to an improvement in metering valves especially designed and adapted for use in oil control devices of the type interposed between a reservoir for liquid fuel and a gravity fed oil burner.

An object of the invention is to provide a metering valve of this character, which makes it practical to have a precision control over the flow of the oil, the valve providing for a maximum flow for high fire, a minimum flow for low pilot fire, and also for a complete shut-off of the flow of the fuel.

Another object of the invention is to provide a metering valve of this character and having these advantages, which is simple, compact, and closely organized in construction, reliable and efficient in operation, capable of a wide range of adjustments, and easily and comparatively inexpensive to manufacture.

Other objects and advantages reside in certain novel features of the construction, arrangement, and combination of parts, which will be hereinafter more fully described and particularly pointed out in the appended claims, reference being had to the accompanying drawings forming a part of this specification, and in which:

Figure 1 is a view in top plan showing an oil control device equipped with a metering valve embodying the present invention;

Figure 2 is a view in top plan of the device shown in Figure 1 but with the cover plate and metering valve mechanism (except for the metering valve seat) removed;

Figure 3 is a view partly in side elevation and partly in central, vertical, longitudinal cross section, showing the oil control device illustrated in Figure 1;

Figure 5:
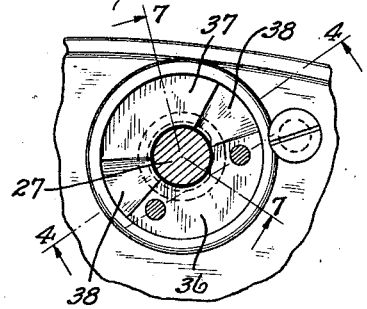
Figure 6:
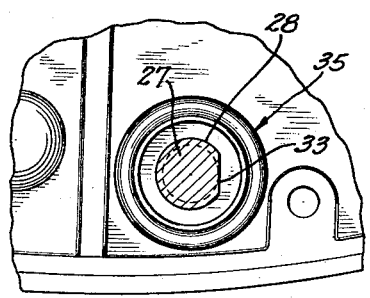
Figure 7:
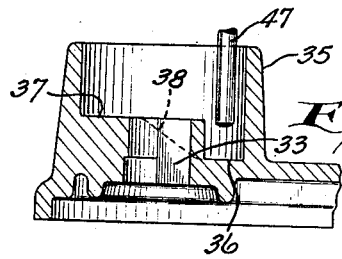
Figure 4:
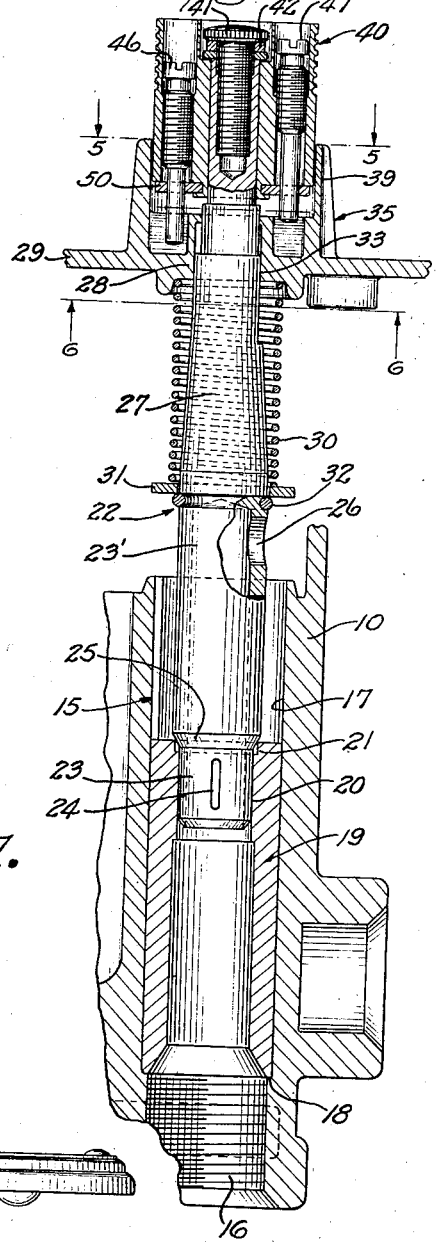
Figure 4 is a fragmentary view in vertical cross section, taken on line 4—4 of Figure 5, with parts shown in elevation and parts broken away for the sake of illustration.
Figure 8:
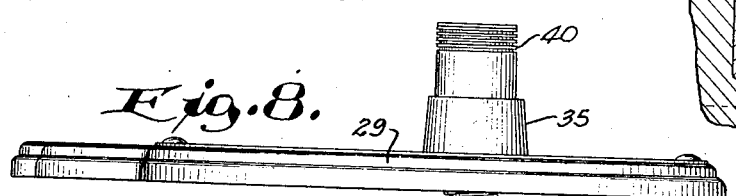
Figure 9:
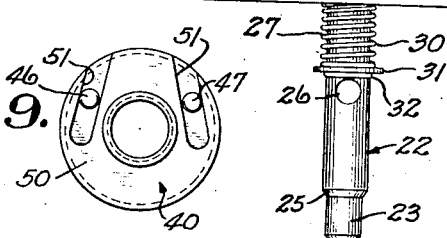

Figures 5 and 6 are fragmentary views in horizontal cross section, taken on lines 5—5 and 6—6, respectively, of Figure 4;

Figure 7 is a fragmentary view in vertical cross section taken on line 7—7 of Figure 5;

Figure 8 is a view in side elevation showing the cover plate of the oil control device and the metering valve mechanism assembled therewith; and Figure 9 is a bottom plan view of the manually adjustable control knob illustrating the slotted locking plate for releasably securing the high and low fire screws in their various adjusted positions.

Referring to the drawings, the numeral 10 designates the casing of an oil control device in which the present invention is specially adapted to be embodied. The casing 10 has a main liquid supply chamber 11 therein. Liquid fuel is supplied to the chamber 11 through an inlet 12 under the regulation of a float-controlled inlet valve 13, whereby a constant level of liquid is maintained in the supply chamber 11. Safety shut-off mechanism, designated generally at 14, is combined with the means which maintains the level of liquid in the supply chamber 11 in the manner fully described and claimed in my Patents 2,068,138, granted January 19, 1937, and 2,120,364, granted June 14, 1938.

The liquid flows out of the main supply chamber 11 through one or more outlet passages 15 which are connected up to the burner (not shown). As the outlet passages and their associated metering valve mechanisms are identical, a description and illustration of but one will serve. Each outlet passage 15 has its lower end portion internally threaded, as at 16, to adapt it for connection with the burner, but above the internally threaded portion 16 the outlet passage is machined so as to be smooth and cylindrical, such smooth and cylindrical portion being designated at 17. At the juncture of the portions 16 and 17 of the outlet passage a shoulder 18 is provided.

A valve seat 19, which may take the form of a sleeve, is press-fitted in the smooth portion 17 of the outlet passage, and has its lower end abutting the shoulder 18. The interior of the valve seat sleeve 19 at its upper end is machined to provide a valve guide 20 and a valve seat proper 21.

A metering valve, designated generally 22, is provided and has its lower end reduced, as at 23, the reduced lower end 23 being a sliding fit in the guiding portion 20 of the valve seat sleeve. A metering slot 24 is provided in the reduced portion 23 of the metering valve. At the juncture of the reduced portion 23 of the metering valve and the main portion thereof there is a beveled valve face 25, which is cooperable with the seat 21 to shut off the flow in the closed position of the valve. The main portion 23' and the reduced portion 23 of the metering valve are tubular or hollow, and at a point above the liquid level maintained in the liquid supply chamber the main portion 23' is provided with a lateral vent hole 26. Integral with the main portion 23' of the valve is the solid valve stem 27 which extends up through the guiding opening 28 provided therefor in the cover plate 29 of the main casing.

The metering valve is biased to closed position, and for this purpose a coil spring 30 encircles the stem 27 of the valve and has its upper end abutting the under side of the cover plate 29 and its lower end abutting the washer 31 held in position on the stem by means of a snap C ring 32 which snaps into a groove provided therefor in the valve stem and projects beyond the groove sufficiently to provide a shoulder or abutment for the washer 31. A portion of the valve stem which is slidably fitted in the guiding opening 28 is of non-circular cross section, as, for example, it may be provided with a flat 33. The guiding opening 28, except for its extended upper end which is provided with an inturned flange 28', is of corresponding cross section and so constrains the valve stem and metering valve to rectilinear vertical movement, any turning of the valve being positively prevented. The stem of the metering valve projects above the cover plate 29. Above the flat 33 the valve stem has a cylindrical guiding portion 33' slidably engaged with flange 28'.

A cup-like structure, designated generally at 35, surrounds the projecting portion of the valve stem and may be cast integral with the cover plate. The floor of this cup-like structure is provided with two levels, a lower level 36 and an upper level 37, these levels being connected by means of inclines 38. Surrounding these levels of the cup-like structure is the peripheral wall 39 which is cylindrical in form and open at its upper end. A manually adjustable control knob 40 is swiveled to the upper end of the valve stem. For this purpose the upper end of the valve stem may be provided with an internally threaded axial opening extending out through the top thereof. The control knob also has an axial opening to enable it to be fitted over the reduced upper end of the valve stem, and the opening through the control knob is countersunk at its upper end to accommodate a screw 41 and washer 42 which prevents axial displacement of the knob off of the end of the valve stem while leaving it free to rotate relative thereto.

The control knob is also provided with a plurality (usually two) of eccentric, angularly displaced and internally threaded openings 44 and 45. High and low fire screws 46 and 47 are combined with these openings in that the threaded portions in their shanks are interthreaded with the internal threads with these openings. These screws have their lower ends unthreaded and reduced and terminating in rounded tips which are adapted to ride on the inclines 38 and selectively on the higher level 37 of the floor of the cup-like structure.

With such a construction, the valve may be accurately calibrated at the factory or in the field to obtain just the correct flow of oil for the low flame or pilot flame and for the high flame. Once calibrated the straight line action of the valve insures a uniform control of the flow. It is to be understood that when the knob is adjusted to cause the tip of the low fire screw 47 to ride on the upper level 37, the metering valve will be open to provide for a low pilot flame; whereas when the screw 46 is engaged at its high level then the valve is fully opened and a high fire or high flame is had. If the knob is so adjusted with both screws overlying the low level, then the metering valve is fully closed and the flow of oil is shut off.

For the purpose of releasably securing the adjusting screws 46 and 47 in any of their various positions, a locking plate 50 is secured to the lower end of the knob and has slots 51 through which the unthreaded lower ends of the screws project and in which they are frictionally fitted. The locking plate is resilient and the slots are so dimensioned that the walls thereof frictionally grip the lower ends of the screws and retain them in any adjustment.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. A device of the character described comprising a casing having a liquid fuel supply chamber therein provided with an outlet passage having a valve seat therein, a cover for said casing having an opening in vertical alinement with said outlet passage, a metering valve regulating flow through said outlet passage and having a valve stem extending through the opening and projecting above the cover, means for biasing the metering valve to closed position, means constraining the metering valve to straight line movement toward and away from its seat, a cup-like structure on the cover surrounding the projecting portion of the metering valve stem and having its floor provided with substantially flat upper and lower levels with inclines connecting the levels, a manually operable control knob swiveled to the projecting portion of the stem, a pair of adjusting screws threadedly interconnected with the knob, said screws being eccentrically disposed on the knob, being angularly spaced and having their lower ends projecting below the knob whereby said screws, upon appropriate adjustment of the knob, may be selectively engaged with the upper floor level to provide for either high or low fire dependent upon the one of said screws so engaged or both of said screws may be alined with the lower floor level to provide for complete closure of the metering valve.

2. A device of the character described comprising a casing having a liquid fuel supply chamber provided with an outlet, a cover for the casing formed with an opening in vertical alinement with the outlet, a metering valve biased to closed position regulating flow through the outlet and having its stem projecting through said opening, means constraining the metering valve to straight line movement toward and away from its seat, a manually operable control knob swiveled to the projecting portion of the stem, a pair of adjusting screws threadedly interconnected with the knob, said screws being eccentrically disposed on the knob, being angularly spaced, and having their lower ends projecting different distances below the knob, and an annular abutment underlying the screws and formed with a single, flat, elevated surface having an angular extent of less than one hundred and eighty degrees and with which said screws are severally and selectively engageable to provide for either high or low fire dependent upon individual engagement of the lower ends of said screws with the flat surface, said abutment having a depressed floor over which the screws may also be brought to provide for complete closure of the valve, there being inclines between the floor and the elevated surface of the abutment to facilitate shifting of the screws from the floor to the elevated surface.

ROY W. JOHNSON.